United States Patent
Nagai et al.

(10) Patent No.: US 8,174,951 B2
(45) Date of Patent: May 8, 2012

(54) OPTICAL INFORMATION RECORDING METHOD AND APPARATUS

(75) Inventors: Yutaka Nagai, Yokohama (JP); Yusuke Nakamura, Ebina (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 63 days.

(21) Appl. No.: 12/625,633

(22) Filed: Nov. 25, 2009

(65) Prior Publication Data

US 2010/0202270 A1    Aug. 12, 2010

(30) Foreign Application Priority Data

Feb. 9, 2009   (JP) ................... 2009-026867

(51) Int. Cl.
*G11B 7/00*   (2006.01)
(52) U.S. Cl. .................. 369/103; 369/53.22; 369/54.24
(58) Field of Classification Search ............. 359/24, 359/3; 369/103, 53.22, 53.24; 702/10; 386/83
See application file for complete search history.

(56) References Cited

U.S. PATENT DOCUMENTS

| | | | | |
|---|---|---|---|---|
| 5,650,991 A * | 7/1997 | Fujiie | ................... | 369/53.22 |
| 7,557,971 B1 * | 7/2009 | Sigel et al. | ................... | 359/24 |
| 2004/0179251 A1 | 9/2004 | Anderson et al. | | |
| 2007/0091768 A1 | 4/2007 | Hori et al. | | |
| 2007/0140651 A1 * | 6/2007 | Hashimoto et al. | ............ | 386/83 |
| 2007/0206250 A1 * | 9/2007 | Takano et al. | ................... | 359/3 |
| 2008/0137512 A1 * | 6/2008 | Chol et al. | ................... | 369/103 |
| 2008/0192311 A1 | 8/2008 | Horimai | | |
| 2008/0221814 A1 * | 9/2008 | Trainer | ..................... | 702/70 |
| 2009/0103416 A1 * | 4/2009 | Smith et al. | ................... | 369/103 |

FOREIGN PATENT DOCUMENTS

| | | |
|---|---|---|
| JP | 11-133843 | 5/1999 |
| JP | 2004-272268 | 9/2004 |
| JP | 2007-122005 | 5/2007 |
| JP | 2007-256945 | 10/2007 |
| WO | WO 2004/102542 A1 | 11/2004 |

* cited by examiner

*Primary Examiner* — Thuy Pardo
(74) *Attorney, Agent, or Firm* — Antonelli, Terry, Stout & Kraus, LLP.

(57) ABSTRACT

In a recording apparatus capable of performing a curing process at high speed by curing a plurality of books at a time during recording and capable of performing recording of a recordable type, when recording is stopped once, the unit of books to be cured at a time is set smaller than that during continuous recording, in order to realize inexpensively both performing a curing process at high speed in hologram recording and realizing recording of a recordable type freely in a book unit. It is therefore possible to terminate recording in the unit of arbitrary books irrespective of the unit of books to be cured, and perform recording of a recordable type without loss.

7 Claims, 10 Drawing Sheets

OPTICAL INFORMATION RECORDING METHOD AND APPARATUS

INCORPORATION BY REFERENCE

The present application claims priority from Japanese application JP2009-026867 filed on Feb. 9, 2009, the content of which is hereby incorporated by reference into this application.

BACKGROUND OF THE INVENTION

The present invention relates to an optical information recording method and apparatus.

Optical discs having a recording density of about 50 GB are now commercially available even for public use, which discs use blue-violet semiconductor laser beams and rely upon Blu-Ray Disc (BD) specifications, High Definition Digital Versatile Disc (HD DVD) specifications and the like.

Now, optical discs that will have a capacity as large as a Hard Disc Drive (HDD) having a capacity of e.g., 100 GB to 1 TB are desired.

However, in order to realize such an ultra high density of an optical disc, new storage techniques are required which are different from conventional high density techniques which resort to a shorter wavelength and a high objective lens NA.

Researches of next generation storage techniques are under progress, and holographic recording techniques have been paid attention.

The holographic recording techniques are techniques of superposing in a recording medium a signal beam having information on page data two-dimensionally modulated by a spatial light modulator and a reference beam and causing refraction index modulation in the recording medium in accordance with an interference fringe pattern formed upon superposition to thereby record information in the recording medium.

For information reproduction, upon application of the reference beam used for recording to the recording medium in the same layout, a diffraction beam is generated because holograms recorded in the recording medium function as diffraction grating. This diffraction beam is reproduced as the same beam as the recorded signal beam including phase information.

The reproduced signal beam is detected two-dimensionally at high speed with an optical detector such as CMOS and CCD. According to the holographic recording techniques, by using one hologram, two-dimensional information can be recorded in an optical recording medium at a time and this information can be reproduced. Since a plurality of sets of page data can be written in a superposed manner in the same area of a recording medium, it is very effective for recording/reproducing information of a large capacity at high speed.

Hologram recording techniques are described, for example, in JP-A-2004-272268 (Patent Document 1). This publication describes a so-called angle multiplex recording method by which a signal beam is converged to an optical information recording medium via a lens, at the same time a reference beam as a parallel beam is applied to be interfered with the signal beam and record a hologram, and while an incidence angle of the reference beam upon the optical information recording medium is changed, different page data is displayed on a spatial light modulator to perform multiplex recording. This publication also describes the techniques that a space between adjacent holograms can be made short by disposing an aperture or opening (spatial filter) at a beam waist of the signal beam converged by a lens so that recording density/capacity can be increased more than a conventional angle multiplex recording method.

Hologram recording techniques are also described, for example, in WO2004-102542 (Patent Document 2). This publication describes an example utilizing a shift multiplex method. In this method, light from an inner side pixel of one spatial light modulator is used as a signal beam, light from an outer side pixel in a ring stripe is used as a reference beam, and both the beams are converged to an optical recording medium via the same lens to make both the beams interfere each other near at a focal point plane of the lens to thereby record a hologram.

Hologram recording techniques are also described, for example, in JP-A-2007-256945 (Patent Document 3). This publication describes techniques of curing a holographic recording medium after multiple recording to ensure reliable reproduction.

SUMMARY OF THE INVENTION

As described in Patent Document 3, an optical system for curing and reliable reproduction and an optical system for recording are provided independently to make a curing time nearly unnecessary by performing a curing process for a volume while multiple recording is performed for another volume. However, since two optical systems are used, it is difficult to make the structure inexpensive, and in addition it becomes difficult to adopt both a conventional recording method and optical system of bit by bit like CD, DVD or Blu-ray Disc.

An object of the present invention is to realize high speed and inexpensive holographic recording.

This issue is settled by the inventions recited in appended claims.

According to the present invention, it is possible to realize high speed and inexpensive holographic recording.

Other objects, features and advantages of the invention will become apparent from the following description of the embodiments of the invention taken in conjunction with the accompanying drawings.

DETAILED DESCRIPTION OF THE EMBODIMENTS

Figure 1:
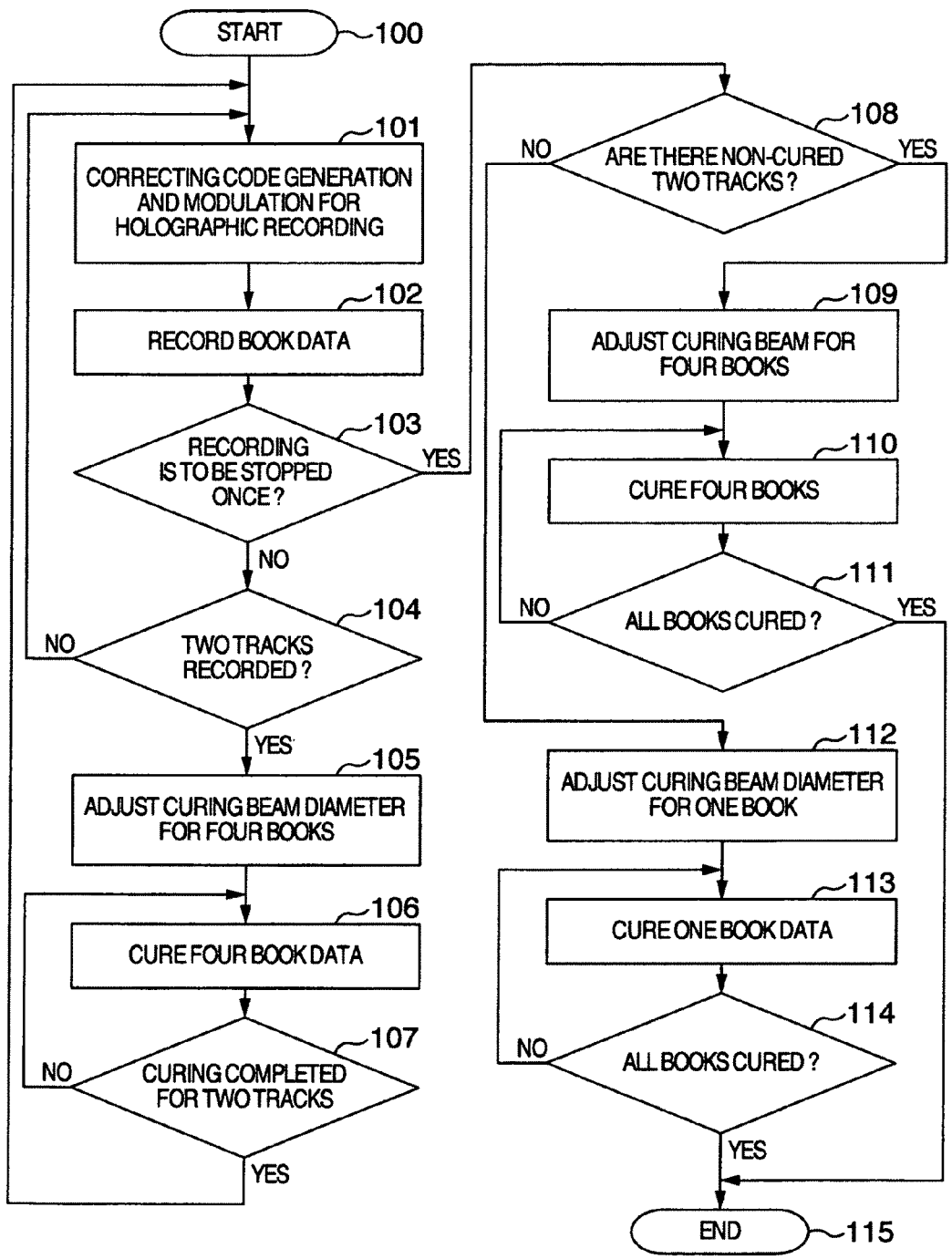
FIG. 1 is a flow chart illustrating a holographic recording method according to an embodiment.

Description will now be made on a first embodiment of the present invention. Description will be made by applying the embodiment to an angle multiple recording method. FIG. 1 is a flow chart illustrating an optical information recording method of recording digital information by utilizing holography. As a recording process starts (Step 100), an encoding process for holographic recording of input data is executed including a correcting code generating process, a modulating process and the like (Step 101) to generate an image of two dimensional page data, and an interference fringe with a reference beam is angle multiple recorded in the same or generally the same volume (Step 102). Data multiple recorded in the same or generally the same volume is called a book. The following operation is performed if a recording method is not "disc at once" but a recordable type. Each time recording is performed in a book unit, it is judged whether recording is to be stopped once (Step 103). If recording is to be continued (No at Step 103), it is judged whether recording has been performed a predetermined amount (Step 104). In this embodiment, it is judged whether recording corresponding in amount to books of two tracks has been performed. The unit of two tracks is an example of the unit that if curing of four books is performed, curing can be performed without any book not cured. If it is judged at Step 104 that recording of two tracks has not been performed (No at Step 104), Steps 101, 102 and 103 are repeated to continue recording in the book unit. If it is judged at Step 104 that recording of books of two tracks has been performed (Yes at Step 104), a curing process is performed for recorded books of two tracks. In executing a curing process, a diameter of a curing beam to be applied to a disc is adjusted to have a diameter corresponding to four books (Step 105). By using the curing beam whose diameter was adjusted to have a diameter corresponding to four books, recorded books of two tracks are cured in the unit of four books (Steps 106 and 107). If recording is to be continued, processes at Steps 101 to 107 are repeated. On the other hand, if it is judged at Step 103 that recording is to be stopped once (Yes at Step 103), it is judged whether the number of books already recorded and still not cured at the recording stop time corresponds to just two tracks (Step 108). If it is judged that the number corresponds to just two tracks (Yes at Step 108), a diameter of a curing beam is adjusted to have a diameter corresponding to four books (Step 109). By using the curing beam whose diameter was adjusted to have a diameter corresponding to four books, already recorded books of two tracks are cured in the unit of four books (Steps 110 and 111). If the curing process is completed (Yes at Step 111), recording is terminated (Step 115). If it is judged at Step 108 that the number of books still not cured does not correspond to just two tracks, there is a possibility that curing in the unit of four books may leave books not cured. Therefore, curing is performed in the unit of one book as in the following until the last book at which recording was stopped once is cured. First, a diameter of a curing beam is adjusted to have a diameter corresponding to one book (Step 112). Already recorded books are cured one after another by the curing beam adjusted to have a diameter corresponding to one book (Steps 113 and 114). As curing is completed (Yes at Step 114), recording is terminated (Step 115). As described above, according to the embodiment, even if recording in a unit of arbitrary books is stopped once in a recordable type system, there are no books left uncured and efficient recording is possible. Namely, if recording is to be continued, a diameter of a curing beam is made large to cure a plurality of books at a time so that high speed processing is possible. If recording is stopped once, a diameter of a curing beam is made small to cure books one after another without leaving recorded books not cured. As an example of curing books in the unit of plural books while recording continues, each time books of two tracks are recorded, four books are cured at a time. It is not limited to this numerical relation, but any other relation may be adopted if the number of books at which recording is terminated can be divided out by the number of books to be cured at a time. Further, if recording is stopped once, books are cured one after another. However, if books can be cured without leaving books not cured, books may be cured in any unit of four books or smaller. Since the number of books to be cured is switched between continuous recording and recording stop also in a shift multiple recording method, both speeding up the curing process during continuous recording and efficient recording of a recordable type without loss can be established.

Figure 2:
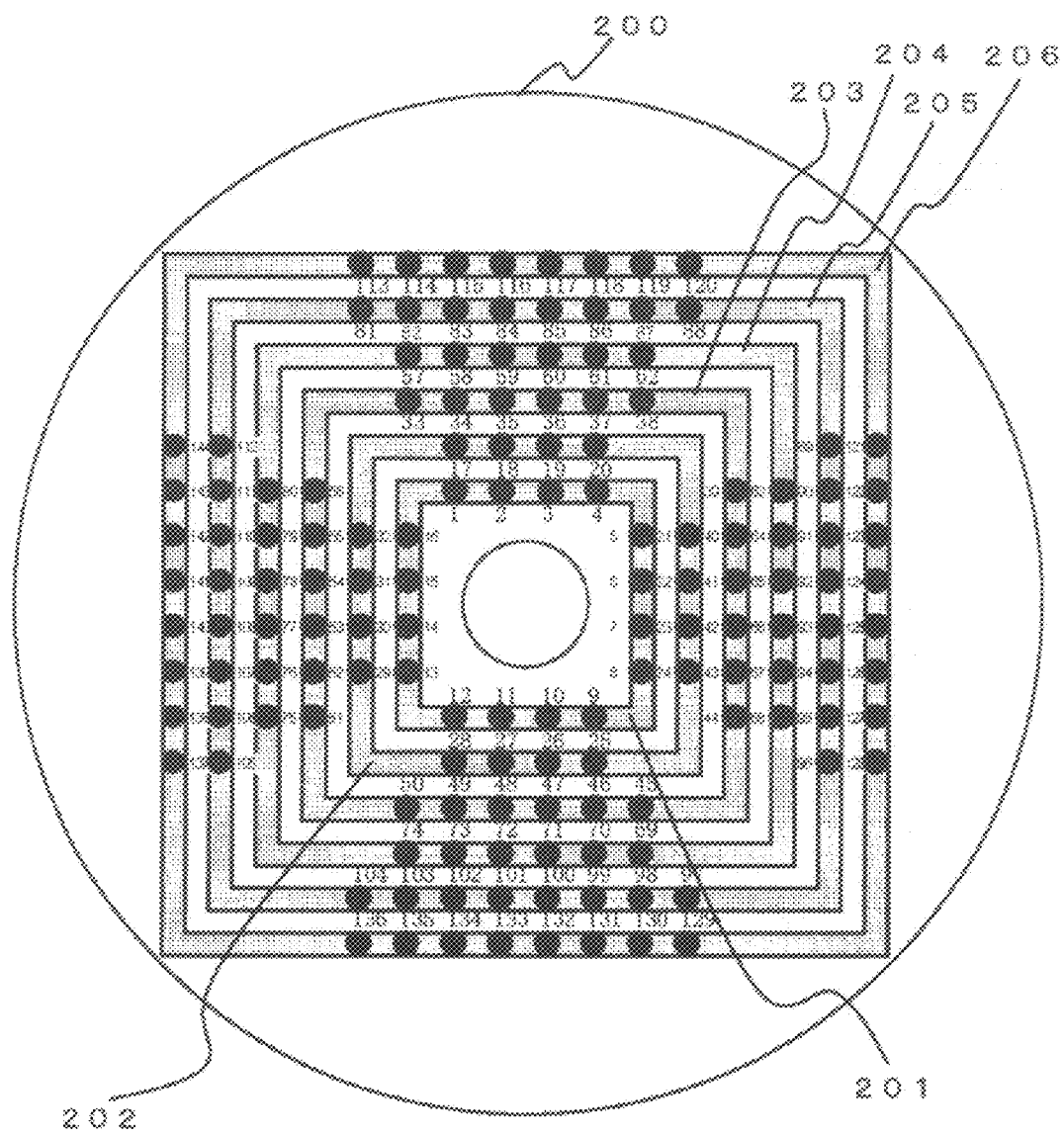
FIG. 2 is a diagram illustrating a holographic recording medium.

Next, with reference to FIG. 2, description will be made on an example of a disc to be used by the holographic recording method of the first embodiment. In FIG. 2, reference numeral 200 represents a disc type holographic recording medium. The disc 200 has recording tracks of a closed shape 201, 202, 203, 204, 205 and 206 (although each recording track is illustrated as a rectangle, it may be circular or spiral. If a circular shape or a spiral shape is used, there are advantages such as feasibility of position alignment for a recording laser). Black circles 1 to 144 on the recording tracks indicate books recorded by angle multiplex recording of data. Books in multiples of "4" are disposed in each combination of the recording tracks 201 and 202, 203 and 204, and 205 and 206. Namely, as books are recorded in the serial number order of 1, 2, 3, ..., each time two tracks are recorded, books in multiples of "4" are recorded. If a curing process is performed each time two tracks are recorded, all books of two tracks can be cured entirely even every four books are cured at a time.

Figure 3:
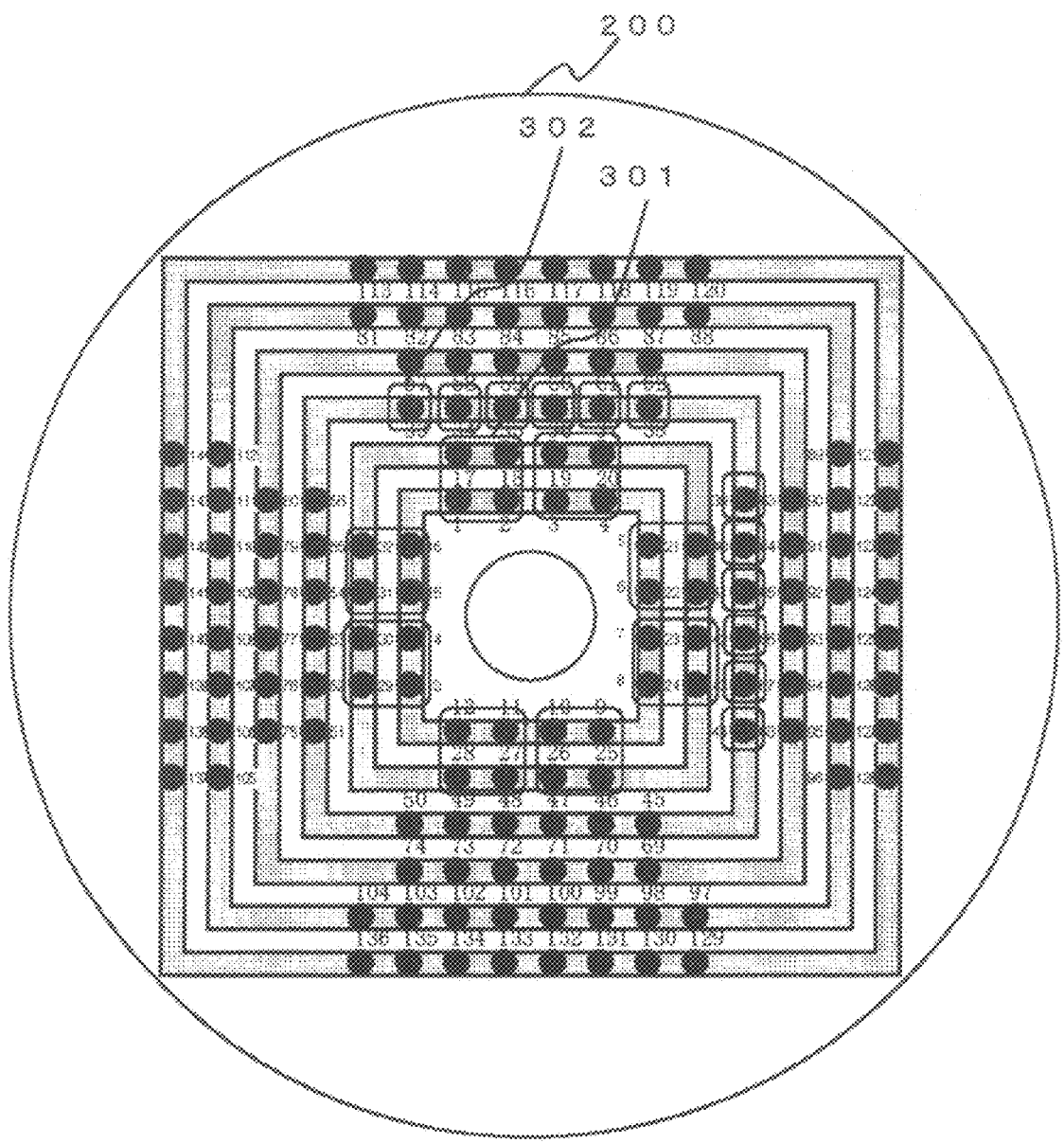
FIG. 3 is a diagram illustrating a holographic recording medium.

Next, with reference to FIG. 3, description will be made on an operation when the first embodiment method is used. FIG. 3 illustrates how a curing beam is controlled relative to the holographic recording medium illustrated in FIG. 2. The recording tracks of the holographic recording medium 200 and black circles indicating book recording positions are the same as those illustrated in FIG. 2. In FIG. 3, description will be made on a case wherein recording is performed in a book unit to the position of the book No. 44, and is once stopped at this position. First, recording is performed in a book unit in a serial number order starting from the book at No. 1. As recording is performed to the book at No. 32, recording of two tracks have been completed so that a curing process is executed. Prior to starting the curing process, the curing beam is adjusted to cover four object books and not cover other books. Reference numeral 301 indicates a curing beam applied to the disc. In FIG. 3, although the curing beam is illustrated as having generally a square shape, a circle shape may be used if the above-described condition is satisfied. By using the curing beam adjusted to cover four books, books at Nos. 1, 2, 17 and 18 are cured at a time. Next, books at Nos. 3, 4, 19 and 20 are cured. Curing four books is performed to the books at Nos. 15, 16, 31 and 32. With these processes, recording and curing for two tracks are completed. Next, recording is performed in a book unit in a serial number order starting from the book at No. 33 to the book at No. 44 at the recording completion position. As recording the book at No. 44 is completed, the recording completion position is different from the border of the unit of two tracks. Therefore, the curing beam is adjusted to cover one object book and not cover other books. Reference numeral 302 represents a curing beam after adjustment. Similar to the curing beam 301, the shape may be circle. By using the curing beam adjusted to cover one book, books from No. 33 to No. 44 are cured one after another. An example of curing by the first embodiment method has been described above with reference to FIG. 3.

Figure 4:
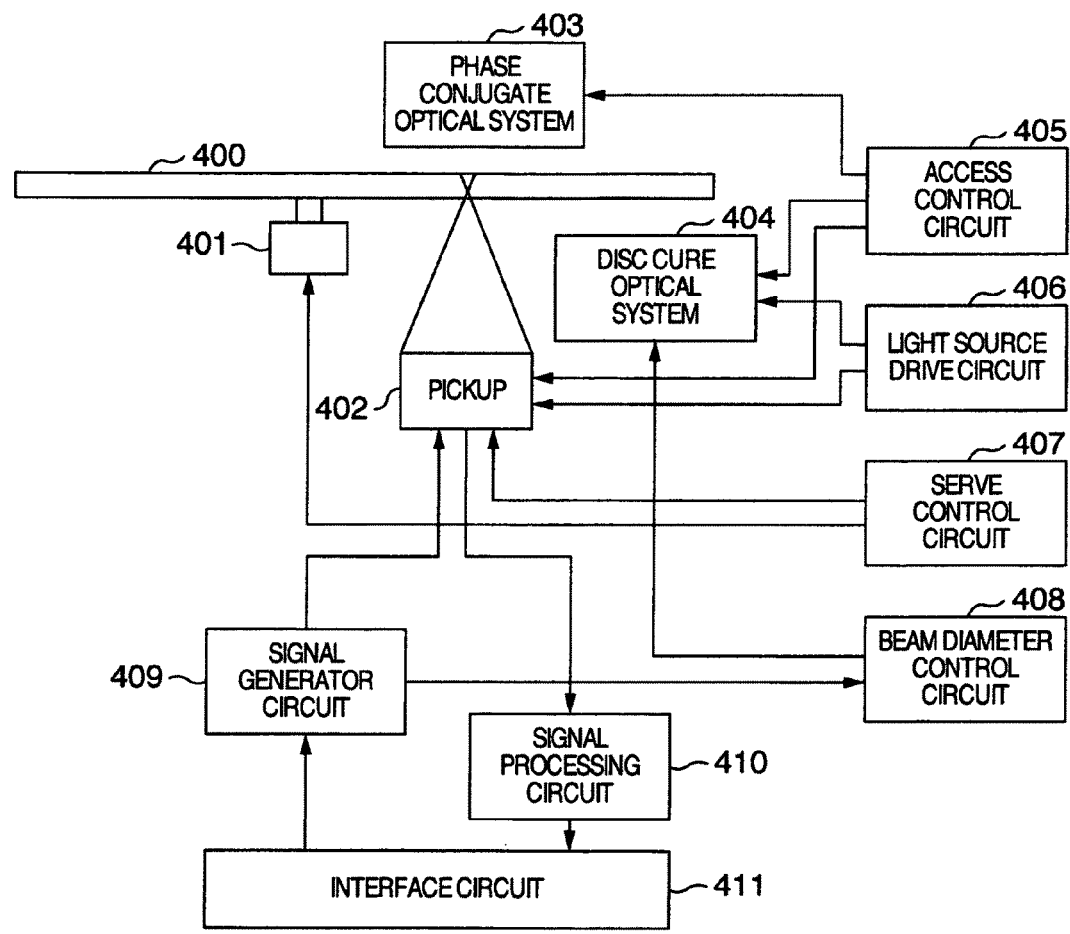
FIG. 4 is a block diagram illustrating a holographic recording apparatus according to an embodiment.

Next, a second embodiment of the present invention will be described with reference to FIG. 4. FIG. 4 is a block diagram of a holographic recording apparatus of the present invention. In FIG. 4, reference numeral 400 represents a holographic recording medium, reference numeral 401 represents an optical pickup for applying a signal beam and a reference beam to the holographic recording medium 400 to record data by utilizing holography. A phase conjugate optical system 403 generates a phase conjugate beam of the reference beam in order for the pickup 402 to reproduce data. Reference numeral 404 represents a disc cure optical system for executing a data curing process by applying a curing beam to recorded data. Reference numeral 405 represents an access control circuit for moving the pickup 402, phase conjugate optical system 403 and disc cure optical system 404 to desired positions of the holographic recording medium 400. Reference numeral 406 represents a light source drive circuit for driving laser light sources of the pickup 402 and disc cure optical system 403. A servo control circuit 407 performs rotation control of a disc motor 401 and optical system control of the pickup 402. Reference numeral 408 represents a circuit for controlling a diameter of a curing beam from the disc cure optical system. Reference numeral 409 represents a signal generator circuit for executing a correcting code generating process and a modulation process for an input signal. When the signal generator circuit 409 detects that continuous recording is terminated and recording is stopped, the signal generator circuit 409 sends a switching signal to the beam diameter control circuit 408 to make a curing beam diameter small. A signal processing circuit 410 processes a reproduced signal from the pickup 402 to reproduce recorded data. An interface circuit 411 transfers a signal between an external apparatus and the signal generator circuit 409 and signal processing circuit 410. In this embodiment, when the signal generator circuit detects recording stop, a diameter of a curing beam can be controlled to be small. During continuous recording, a number of books are cured at a time to shorten a curing time, and upon recording stop, a small number of books are cured at a time or books are cured one after another. It is possible to determine flexibly a recording stop position, and a holographic medium recording apparatus having a high recording efficiency is realized. In the description of this embodiment, the beam diameter control circuit 408 switches a curing beam diameter between continuous recording and recording stop. Switching a curing beam diameter between additional recording start and continuous recording has similar advantages. Since the number of books to be cured is switched between continuous recording and recording stop also in a shift multiple recording method, both speeding up of the curing process during continuous recording and efficient recording of a recordable type without loss can be established.

Figure 5:
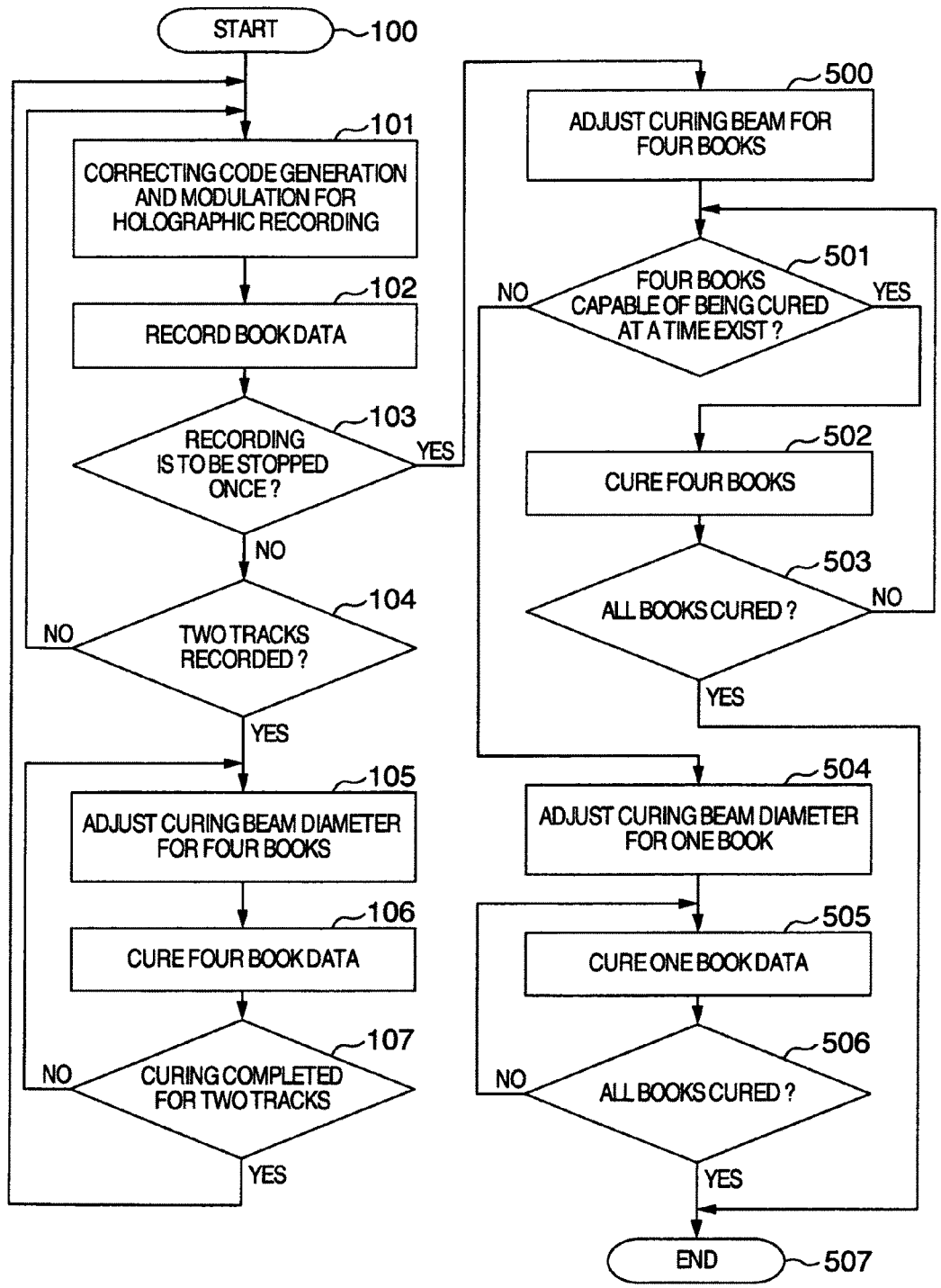
FIG. 5 is a flow chart illustrating a holographic recording method according to another embodiment.

Next, a third embodiment of the present invention will be described. Also in this embodiment, description will be made by applying the embodiment to an angle multiple recording method. FIG. 5 is a flow chart illustrating an optical information recording method of recording digital information by utilizing holography. As a recording process starts (Step 100), an encoding process for holographic recording of input data is executed including a correcting code generation process, a modulating process and the like (Step 101) to generate an image of two dimensional page data, and an interference fringe with a reference beam is angle multiple recorded to form a book (Step 102). The following operation is performed if a recording method is not "disc at once" but a recordable type. Each time recording is performed in a book unit, it is judged whether recording is to be stopped once (Step 103). If recording is to be continued (No at Step 103), it is judged whether recording has been performed a predetermined amount (Step 104). In this embodiment, it is judged whether recording corresponding in amount to books of two tracks has been performed. The unit of two tracks is an example of the unit that if curing of four books is performed, curing can be performed without any book not cured. If it is judged at Step 104 that recording of two tracks has not been performed (No at Step 104), steps 101, 102 and 103 are repeated to continue recording in the book unit. If it is judged at Step 104 that recording of books of two tracks has been completed (Yes at Step 104), a curing process is performed for recorded books of two tracks. In executing a curing process, a diameter of a curing beam to be applied to a disc is adjusted to have a diameter corresponding to four books (Step 105). By using the curing beam whose diameter was adjusted to have a diameter corresponding to four books, recorded books of two tracks are cured in the unit of four books (Steps 106 and 107). If recording is to be continued, processes at Steps 101 to 107 are repeated. The operations at Steps 101 to 107 are the same as those of the first embodiment illustrated in FIG. 1. On the other hand, if it is judged at Step 103 that recording is to be stopped once (Yes at Step 103), a diameter of the curing beam to be applied to the disc for curing is adjusted to have a diameter corresponding to four books (Step 500). It is judged whether there are four books disposed in a layout state capable of being cured at a time among books already recorded and still not cured at the recording stop time (Step 501). If there are four books capable of being cured at a time (Yes at Step 501), the cured beam is applied to four books at a time to cure them (Step 502). It is judged whether books still not cured are left (Step 503), and if books are not left (Yes at Step 503), the process is terminated (Step 507). If it is judged that books still not cured are left (No at Step 503), the flow returns to the judgment Step 501 of judging whether there are four books disposed in a state capable of being cured at a time. If there are no four books disposed in a state capable of being cured at a time (No at Step 501), a diameter of a curing beam is adjusted to have a diameter corresponding to one book (Step 504). The curing beam is applied to one book to cure it (Step 505). It is judged whether books still not cured are left (Step 506), and if books still not cured are not left (Yes at Step 506), the process is terminated (Step 507). If it is judged that books still not fixed are left (No at Step 506), the flow returns to Step 505. As described above, according to the embodiment, different processes are divisionally used for continuous recording and recording stop. During continuous recording, four books are cured at a time to shorten a curing time, whereas at recording stop, a process of curing four books at a time or a process of curing books one after another is divisionally used depending upon a state of data still not cured. It is therefore possible to shorten a curing time and execute a curing process without leaving books not cured even recording is stopped at an arbitrary book. A recording efficiency is therefore improved more than a case wherein four books are cured always. As an example of curing books in the unit of plural books while recording continues, each time books of two tracks are recorded, four books are cured at a time. It is not limited to this numerical relation, but any other relation may be adopted if the number of books at which recording is terminated can be divided out by the number of books to be cured at a time. Further, at recording stop, although four-book simultaneous curing and one-book simultaneous curing are selectively used, if books can be cured without leaving books not cured, any of the units of books and the unit of four books may be selectively used. Since the number of books to be cured is switched between continuous recording and recording stop also in a shift multiple recording method, both speeding up the curing process during continuous recording and efficient recording of a recordable type without loss can be established.

Figure 6:
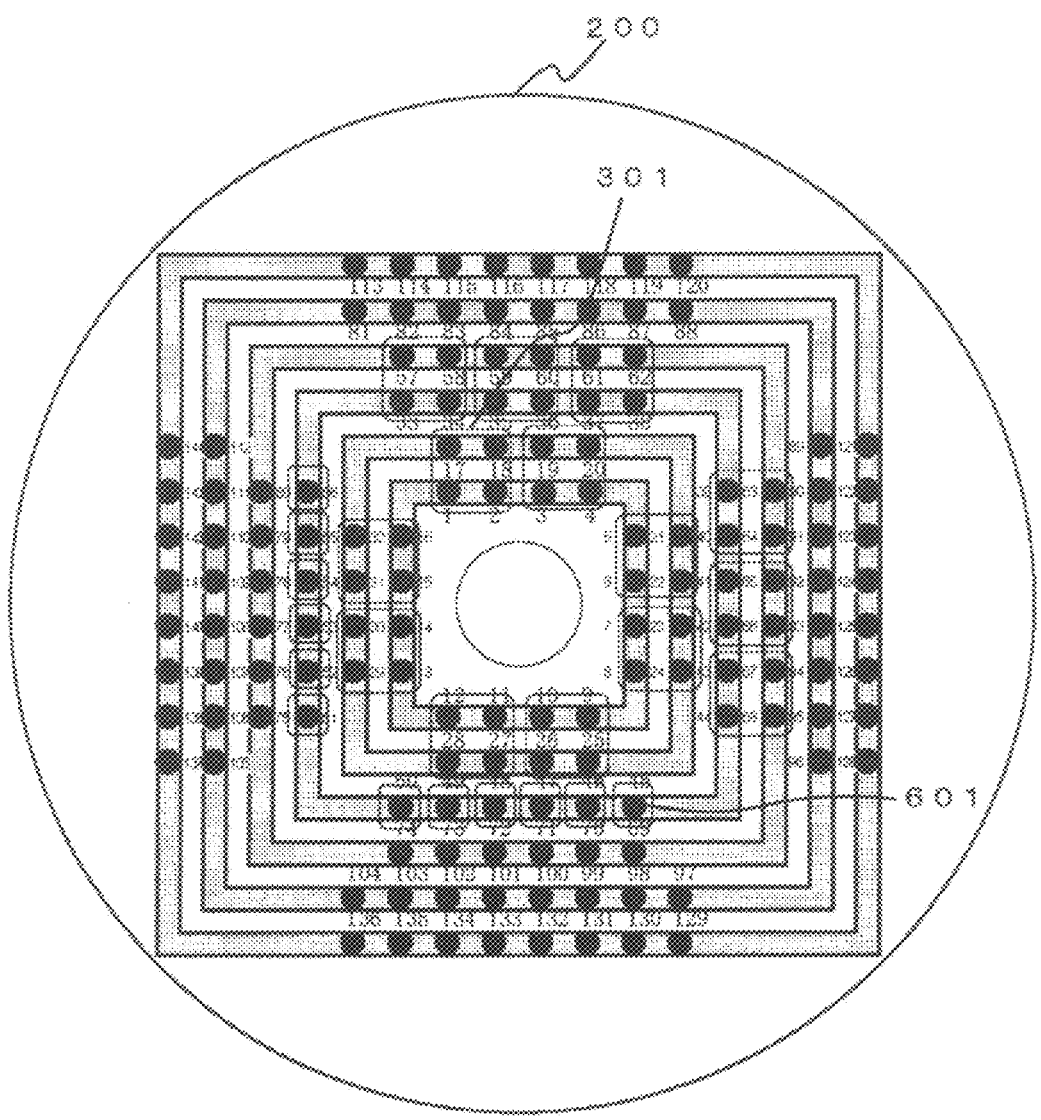
FIG. 6 is a diagram illustrating a holographic recording medium.

Next, with reference to FIG. 6, description will be made on an operation when the third embodiment method is used. FIG. 6 illustrates how a curing beam is controlled relative to the holographic recording medium illustrated in FIGS. 2 and 3. The recording tracks of the holographic recording medium 200 and black circles indicating book recording positions are the same as those illustrated in FIGS. 2 and 3. In FIG. 6, description will be made on a case wherein recording is performed in a book unit to the position of the book No. 68, and is once stopped at this position. First, recording is performed in a book unit in a serial number order starting from the book at No. 1. As recording is performed to the book at No. 32, recording of two tracks have been completed so that a curing process is executed. Prior to starting the curing process, the curing beam is adjusted to cover four object books and not cover other books. Reference numeral 301 indicates a curing beam applied to the disc. In FIG. 6, although the curing beam is illustrated as having generally a square shape, a circle shape may be used if the above-described condition is satisfied. By using the curing beam adjusted to cover four books, books at Nos. 1, 2, 17 and 18 are cured at a time. Next, books at Nos. 3, 4, 19 and 20 are cured. Curing four books is performed to the books at Nos. 15, 16, 31 and 32. With these processes, recording and curing for two tracks are completed. Next, recording is performed in a book unit in a serial number order starting from the book at No. 33 to the book at No. 44 at the recording completion position. As recording the book at No. 44 is completed, cureable books with the curing beam 301 are books from Nos. 33, 34, 57 and 58 to Nos. 43, 44, 67, and 68, and these books are cured by curing the curing process six times. Remaining blocks Nos. 45 to 86 are not cured in the unit of four books. A curing beam is therefore adjusted to have a diameter covering one object book and not covering other books. Reference numeral 601 represents a curing beam after adjustment. Similar to the curing beam 301, the shape may be circle. By using the curing beam adjusted to cover one book, books from No. 45 to No. 56 are cured one after another. An example of curing by the third embodiment method has been described above with reference to FIG. 6.

Figure 7:
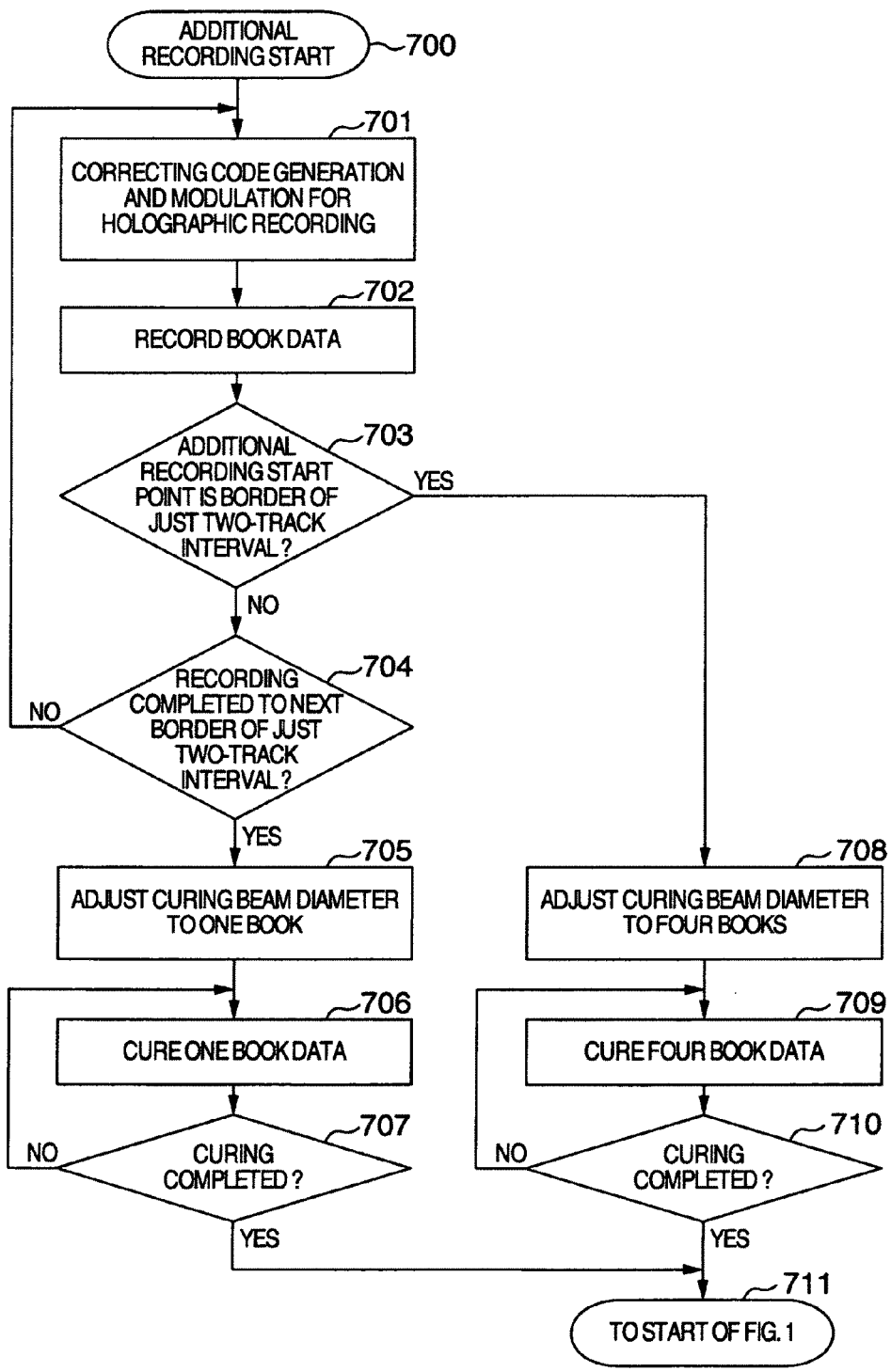
FIG. 7 is a flow chart illustrating a holographic recording method according to another embodiment.

Next, a fourth embodiment of the present invention will be described. Also in this embodiment, description will be made by applying the embodiment to an angle multiple recording method. This embodiment describes a recording method, particularly a recording method of a recordable type by which recording starts from an arbitrary position. FIG. 7 is a flow chart illustrating an optical information recording method of recording digital information by utilizing holography. As a additional recording process starts (Step 700), an encoding process for holographic recording of input data is executed including a correcting code generating process, a modulating process and the like (Step 701) to generate an image of two dimensional page data, and an interference fringe with a reference beam is angle multiple recorded to form a book (Step 702). It is judged whether an additional recording start point is a border position of a just two-track interval from an initial recording position (Step 703). The unit of two tracks is an example of the unit that if curing of four books is performed, curing can be performed without any book not cured. If a additional recording start point is a border position of a just two-track interval from an initial recording position, (Yes at Step 703), the additional recording start position is a border that all books can be cured by curing every four books at a time. In executing a curing process, a diameter of a curing beam to be applied to a disc is adjusted to have a diameter corresponding to four books (Step 709). By using the curing beam whose diameter was adjusted to have a diameter corresponding to four books, recorded books are cured in the unit of four books to the next border of the just two-track interval from the initial recording position (Steps 709 and 710). After curing is completed to the next border of the just two-track interval from the initial recording position, the processes after START of the embodiment illustrated in FIG. 1 or 5 are executed. If the additional recording start point is not a border of the just two-track interval from the initial recording position (No at Step 703), data encoding (Step 701) and recording (Step 702) are executed to the next border of the just two-track interval from the initial recording position. After recording to the next border of the just two-track interval from the initial recording position is completed (Yes at Step 704), the diameter of the curing beam is adjusted to cover one object book and not cover other books (Step 705). After the curing beam diameter is adjusted, curing is performed one book after another to the next border of the just two-track interval (Step 706). After curing is completed to the next border of the just two-track interval (Yes at Step 707), the processes after START of the embodiment illustrated in FIG. 1 or 5 are executed (Step 711). As described above, according to the embodiment, it is possible to execute the curing process without any book not cured, irrespective of the additional recording start position, and to execute the curing process at high speed because a plurality of books are cured at a time during continuous recording. Since the number of books to be cured is switched between continuous recording and additional recording start also in a shift multiple recording method, both speeding up the curing process during continuous recording and efficient recording of a recordable type without loss can be established.

Figure 8:
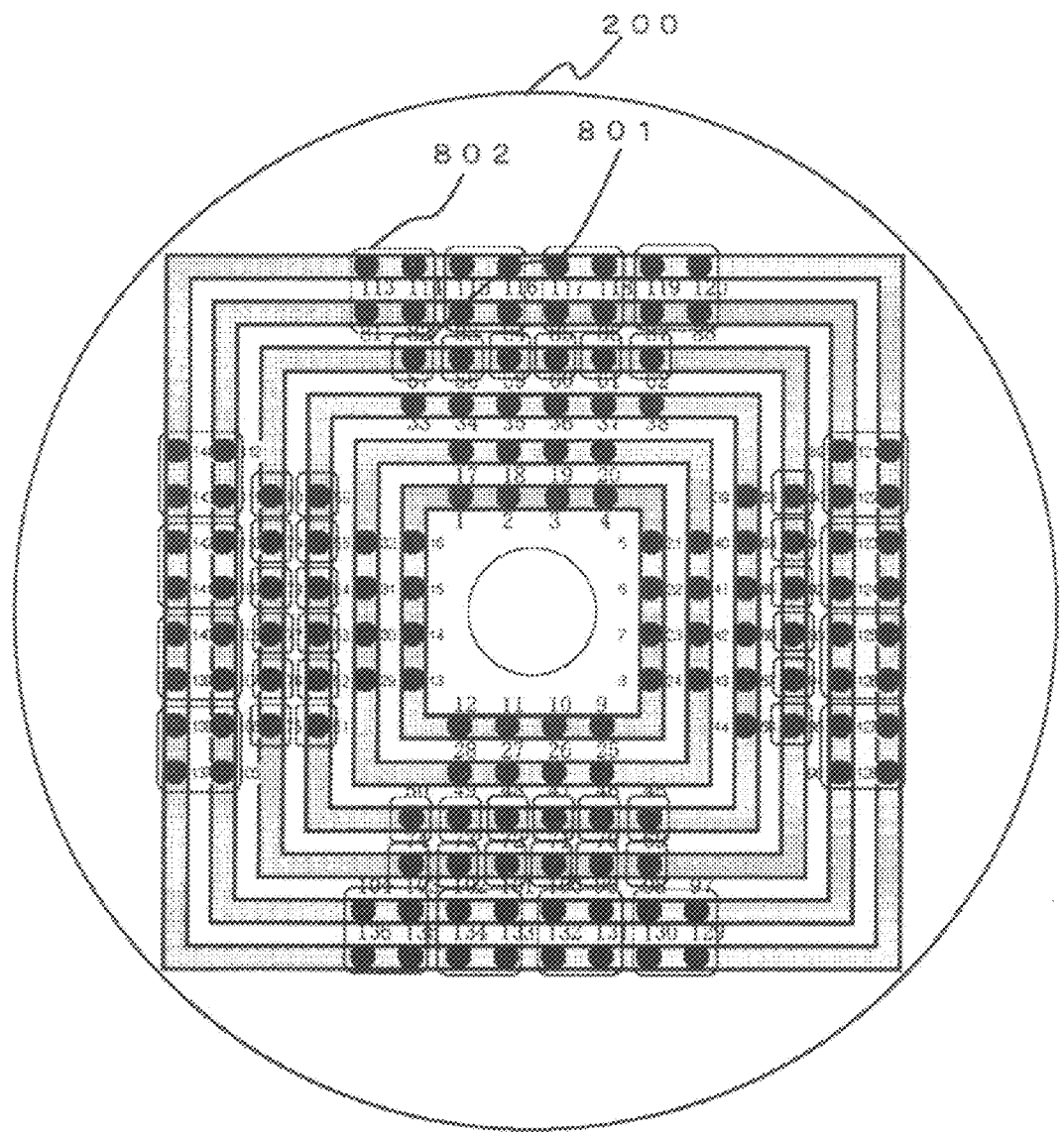
FIG. 8 is a diagram illustrating a holographic recording medium.

Next, with reference to FIG. 8, description will be made on an operation when the fourth embodiment method is used. FIG. 8 illustrates how a curing beam is controlled relative to the holographic recording medium illustrated in FIGS. 2, 3 and 6. The recording tracks of the holographic recording medium 200 and black circles indicating book recording positions are the same as those illustrated in FIGS. 2, 3 and 6. In FIG. 8, description will be made on a case wherein recording of an additional recording starts from a book at No. 45. As recording is performed to the book at No. 80, recording reaches the border in the two-track interval from the book at No. 1 so that the curing process is executed. The book at No. 45 from which recording of the additional recording started is not at the border of the just two-track interval from the initial recording position. Therefore, prior to starting the curing process, the diameter of the curing beam is adjusted to cover one object book and not cover other books. Reference numeral 801 represents a curing beam applied to the disc. In FIG. 8, although the curing beam is illustrated as having generally a square shape, a circle shape may be used if the above-described condition is satisfied. By using the curing beam adjusted to cover one book, books at Nos. 45, 46, 47, 48, . . . , 77, 78, 79 and 80 are sequentially cured. With these processes, recording and curing are completed to the border of the just two-track interval from the boot at No. 1. Next, books at Nos. 81 to 144 are recorded in the book unit in a serial number order. After recording to the book at No. 144 is completed, the curing process is executed. Prior to starting the curing process, the diameter of the curing beam is adjusted to cover four object books and not cover other books. Reference numeral 802 represents a curing beam applied to the disc. In FIG. 8, although the curing beam is illustrated as having generally a square shape, a circle shape may be used if the above-described condition is satisfied. By using the curing beam adjusted to cover four books, books at Nos. 81, 82, 113 and 114 are cured at a time. Next, books at Nos. 83, 84, 115 and 116 are cured al a time. Every four books are cured to the books at Nos. 111, 112, 143 and 144. With these processes, recording and curing are completed for two tracks. During the additional recording process, the diameter of the curing beam is changed.

Figure 9:
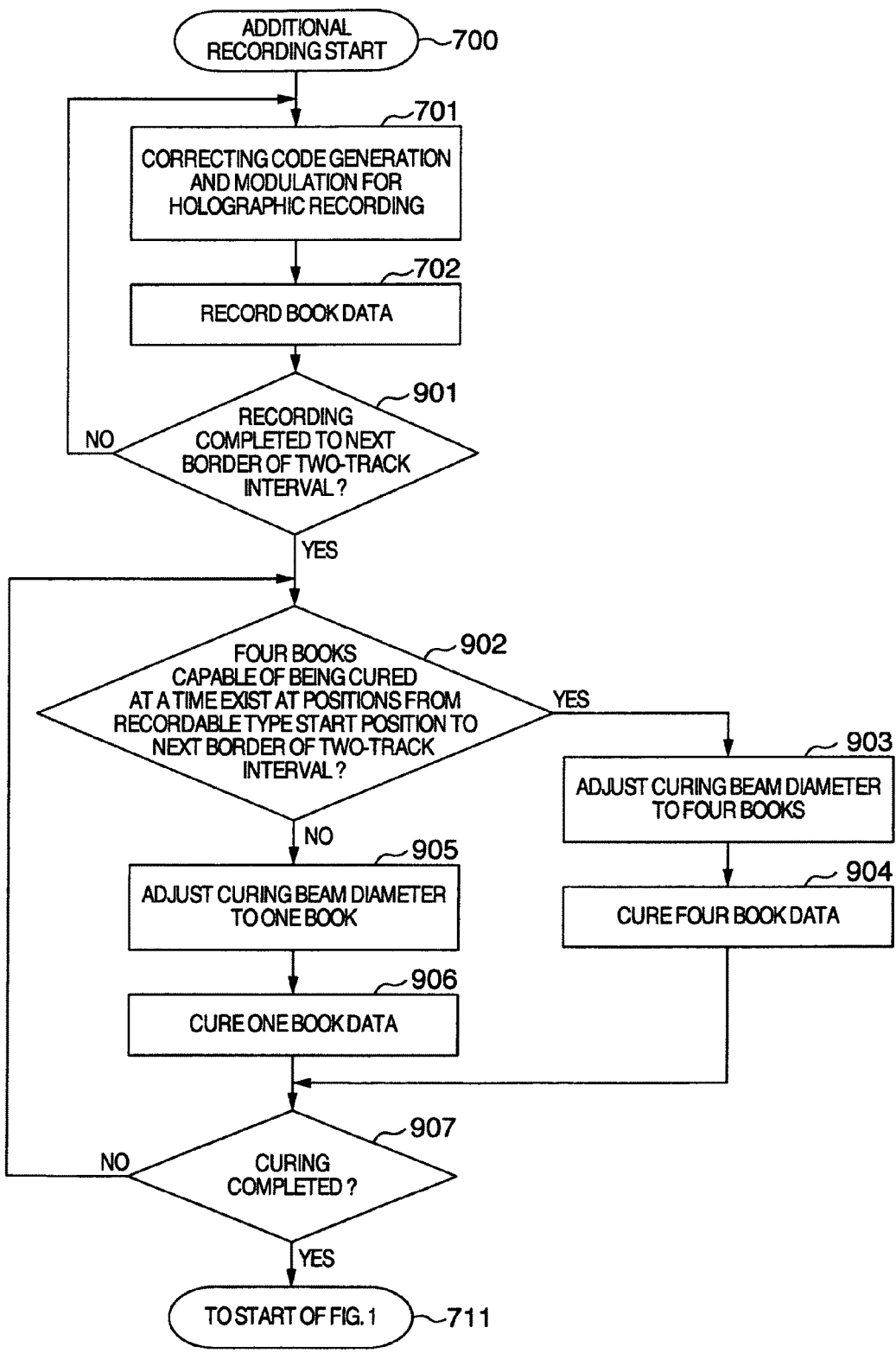
FIG. 9 is a flow chart illustrating a holographic recording method according to another embodiment.

Next, a fifth embodiment of the present invention will be described. Also in this embodiment, description will be made by applying the embodiment to an angle multiple recording method. This embodiment describes a recording method, particularly a recording method of a recordable type by which recording starts from an arbitrary position. FIG. 9 is a flow chart illustrating an optical information recording method of recording digital information by utilizing holography. As an additional recording type process starts (Step 700), an encoding process for holographic recording of input data is executed including a correcting code generating process, a modulating process and the like (Step 701) to generate an image of two dimensional page data, and an interference fringe with a reference beam is angle multiple recorded to form a book (Step 702). Recording is performed until recording reaches the border of the just two-track interval as counted from the initial recording position of a disc (Steps 701, 702 and 901). The unit of two tracks is an example of the unit that if curing of four books is performed, curing can be performed without any book not cured. It is judged whether there are four books capable of being cured at a time at positions from the additional recording start point to the next border of the two-track interval as counted from the initial recording position of a disc (Step 902). If there are four books capable of being cured at a time, the diameter of the curing beam is adjusted to cover four object books and not cover other books (Step 903), and four books are cured at a time (Step 904). It is judged whether curing is completed to the next border of the two-track interval as counted from the initial recording position of a disc (Step 907). If completed, the processes after START of the embodiment illustrated in FIG. 1 or 5 are executed (Step 711). If not completed, the flow returns to the judgment Step 902. If it is judged at Step 902 that four books capable of being cured at a time do not exist at positions from the recordable start point to the next border of the two-track interval as counted from the initial recording position of a disc, the diameter of the curing beam is adjusted to cover one object book and not cover other books (Step 905), and books are cured one after another (Step 906). It is judged whether curing is completed to the next border of the two-track interval as counted from the initial recording position of a disc (Step 907). As described above, according to the embodiment, it is possible to execute the curing process without any book not cured, irrespective of the recordable type start position, and to execute the curing process at high speed because a plurality of books are cured at a time during continuous recording.

Figure 10:
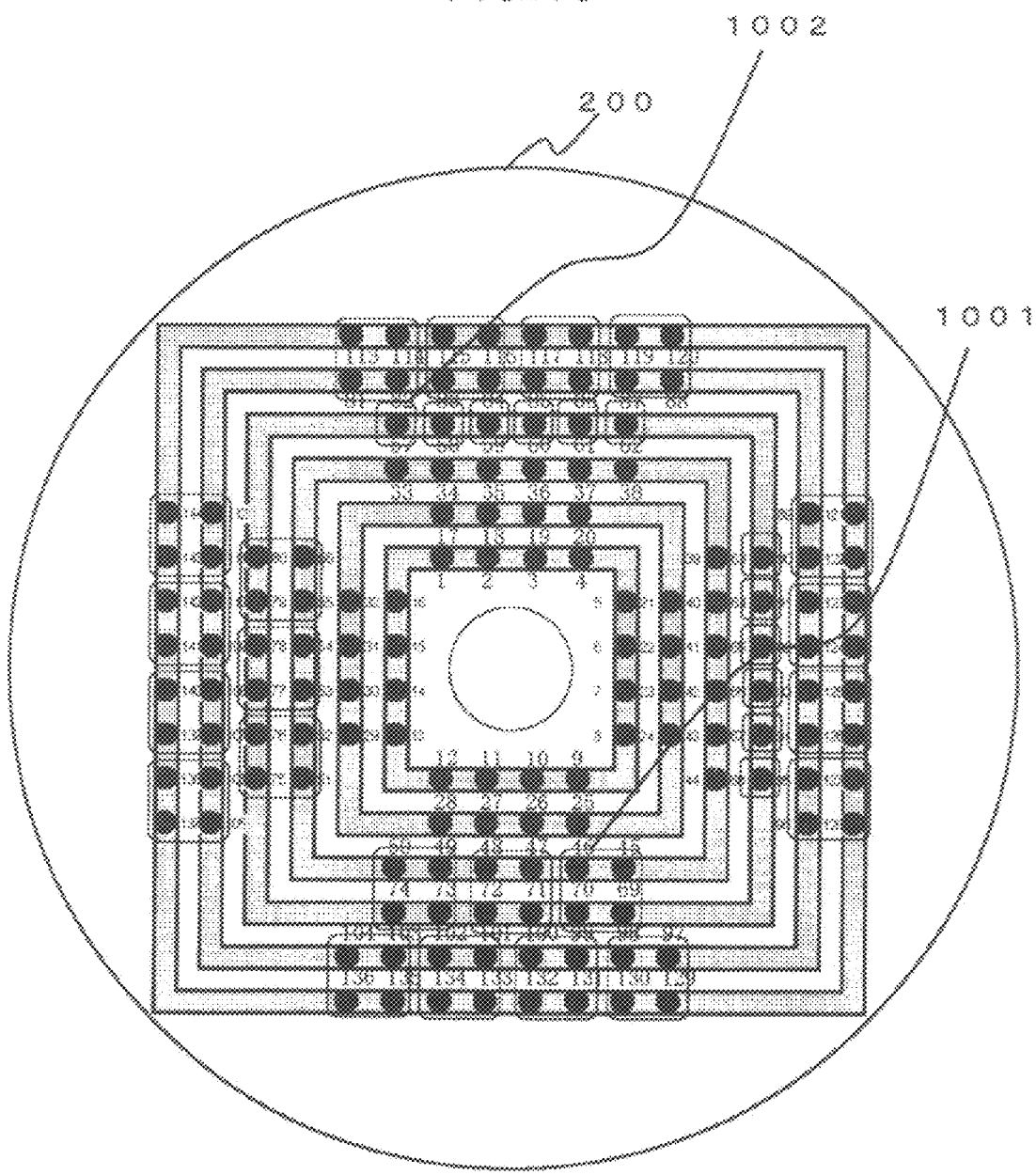
FIG. 10 is a diagram illustrating a holographic recording medium.

Next, with reference to FIG. 10, description will be made on an operation when the fifth embodiment method is used. FIG. 10 illustrates how a curing beam is controlled relative to the holographic recording medium illustrated in FIGS. 2, 3, 6 and 8. The recording tracks of the holographic recording medium 200 and black circles indicating book recording positions are the same as those illustrated in FIGS. 2, 3, 6 and 8. In FIG. 10, description will be made on a case wherein additional recording starts from a book at No. 45. Books are recorded in a book unit in a serial number order starting from the book at No. 45. As recording is performed to the book at No. 80, recording reaches the border in the two-track interval from the book at No. 1 so that the curing process is executed. Prior to starting the curing process, it is judged whether there are four books capable of being cured at a time at positions up to the recording completion position. This judgment indicates that books at Nos. 45, 46, 69 and 70, at Nos. 47, 48, 71 and 72, at Nos. 49, 50, 73 and 74, at Nos. 51, 52, 75 and 76, at Nos. 53, 54, 77 and 78, and at Nos. 55, 56, 79 and 80 can be cured at a time in the unit of four books. Therefore, the diameter of the curing beam is adjusted to cover four books and not cover other books. Reference numeral 1001 represents a curing beam applied to the disc. In FIG. 10, although the curing beam is illustrated as having generally a square shape, a circle shape may be used if the above-described condition is satisfied. By using the curing beam adjusted to cover four books, books at Nos. 45, 46, 69 and 70, at Nos. 47, 48, 71 and 72, at Nos. 49, 50, 73 and 74, at Nos. 51, 52, 75 and 76, at Nos. 53, 54, 77 and 78, and at Nos. 55, 56, 79 and 80 are sequentially cured. Remaining books 57, 58, 59, 60, . . . , 66, 67 and 68 unable to be cured in the unit of four books are cured in a serial number order by adjusting the diameter of the curing beam so as to cover one object book and not cover other books. In this manner, recording and curing are completed to the border of the two-track interval as counted from the book at No. 1. The process for the books at Nos. 81 to 144 is the same as that in the description made with reference to FIG. 8.

According to the embodiments, for example, in the case of a hologram recording apparatus of an angle multiple recording type, curing can be performed at high speed by curing a plurality of books at a time. In a recording apparatus of a recordable type, when recording resumes after recording is stopped once, the unit of books to be cured at a time is switched to the unit of smaller books so that recording can be terminated in the unit of arbitrary books. It is therefore possible to perform recording of a recordable type without loss. Since the number of books to be cured is switched between continuous recording and additional recording start also in a shift multiple recording method, both speeding up the curing process during continuous recording and efficient recording of a recordable type without loss can be established.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A holographic memory recording method of recording information in a holographic memory medium, comprising:
 a recording process of multiplex recording information in a volume or generally in a volume; and
 a post-curing process of simultaneously post-curing a plurality of multiplex recorded volumes that form a unit;
 wherein during said recording process, the post-curing process is executed in a first unit of multiplex recorded volumes;
 wherein upon stoppage of said recording process, said post-curing process is switched from the first unit to a second unit so as to not leave any volume uncured in connection with the post-curing process conducted in the first unit; and
 wherein the switching between the first unit and the second unit is performed by changing a beam diameter of a post-curing beam, in order to change the quantity of volumes that are simultaneously post-cured.

2. The holographic memory recording method according to claim 1, wherein the first unit in which said post-curing process is executed during said recording process is larger than the second unit in which said post-curing process is executed upon stoppage of said recording process.

3. A holographic memory recording method of recording information in a holographic memory medium, comprising:
   a recording process of multiplex recording information in a volume or in generally in a volume, a plurality of volumes being disposed concentrically or spirally to constitute tracks in the holographic memory medium; and
   a post-curing process of simultaneously post-curing a unit of m volumes upon completing recording of n tracks, wherein n and m are natural numbers, each with a value of at least 2;
   wherein if the number of tracks already recorded and still not cured is smaller than the value of n at a time of recording completion, said post-curing process is executed at a unit of p volumes, wherein p is a natural number;
   wherein upon stoppage of said recording process, said post-curing process is switched from the first unit to a second unit so as to not leave any volume uncured in connection with the post-curing process conducted in the first unit; and
   wherein the switching between the first unit and the second unit is performed by changing a beam diameter of a post-curing beam, in order to change the quantity of volumes that are simultaneously post-cured.

4. The holographic memory recording method according to claim 3, wherein the unit of p or m volumes in which said post-curing process is executed satisfies the relationship $p<m$.

5. A holographic memory recording method of recording information in a holographic memory medium of a recordable type, comprising:
   a recording process of multiplex recording information in a volume or generally in a volume; and
   a post-curing process of simultaneously curing a plurality of multiplex recorded volumes that form a unit;
   wherein said post-curing process switches from a first unit to a second unit during continuation of said recording process and upon interception of said recording process in a recordable state;
   wherein upon stoppage of said recording process, said post-curing process is switched from the first unit to a second unit so as to not leave any volume uncured in connection with the post-curing process conducted in the first unit; and
   wherein the switching between the first unit and the second unit is performed by changing a beam diameter of a post-curing beam, in order to change the quantity of volumes that are simultaneously post-cured.

6. A holographic memory recording apparatus for recording information in a holographic memory medium, comprising:
   a recording means for multiplex recording information in a volume or generally in a volume;
   a post-curing means for simultaneously post-curing a plurality of multiplex recorded volumes that form a unit; and
   a switching means for switching, upon stoppage of said recording means, from a first unit in which a post-curing process is executed to a second unit, so as to not leave any volume uncured in connection with the post-curing process conducted in the first unit;
   wherein the switching between the first unit and the second unit is performed by changing a beam diameter of a post-curing beam, in order to change the quantity of volumes that are simultaneously post-cured.

7. A holographic memory recording method of recording information in a holographic memory medium, comprising:
   a recording process of multiplex recording information in a volume or generally in a volume; and
   a post-curing process of simultaneously post-curing a plurality of multiplex recorded volumes that form a unit;
   wherein during said recording process, the post-curing process is executed in a first unit of multiplex recorded volumes;
   wherein the post-curing process is switched from being executed in a first unit to a second unit in at least one of: a starting time of an additional recording, and during continuous recording;
   wherein upon stoppage of said recording process, said post-curing process is switched from the first unit to a second unit so as to not leave any volume uncured in connection with the post-curing process conducted in the first unit; and
   wherein the switching between the first unit and the second unit is performed by changing a beam diameter of a post-curing beam, in order to change the quantity of volumes that are simultaneously post-cured.

* * * * *